Oct. 7, 1969    G. VAL    3,470,597
CUTTING TOOL
Filed Jan. 11, 1967    2 Sheets-Sheet 1
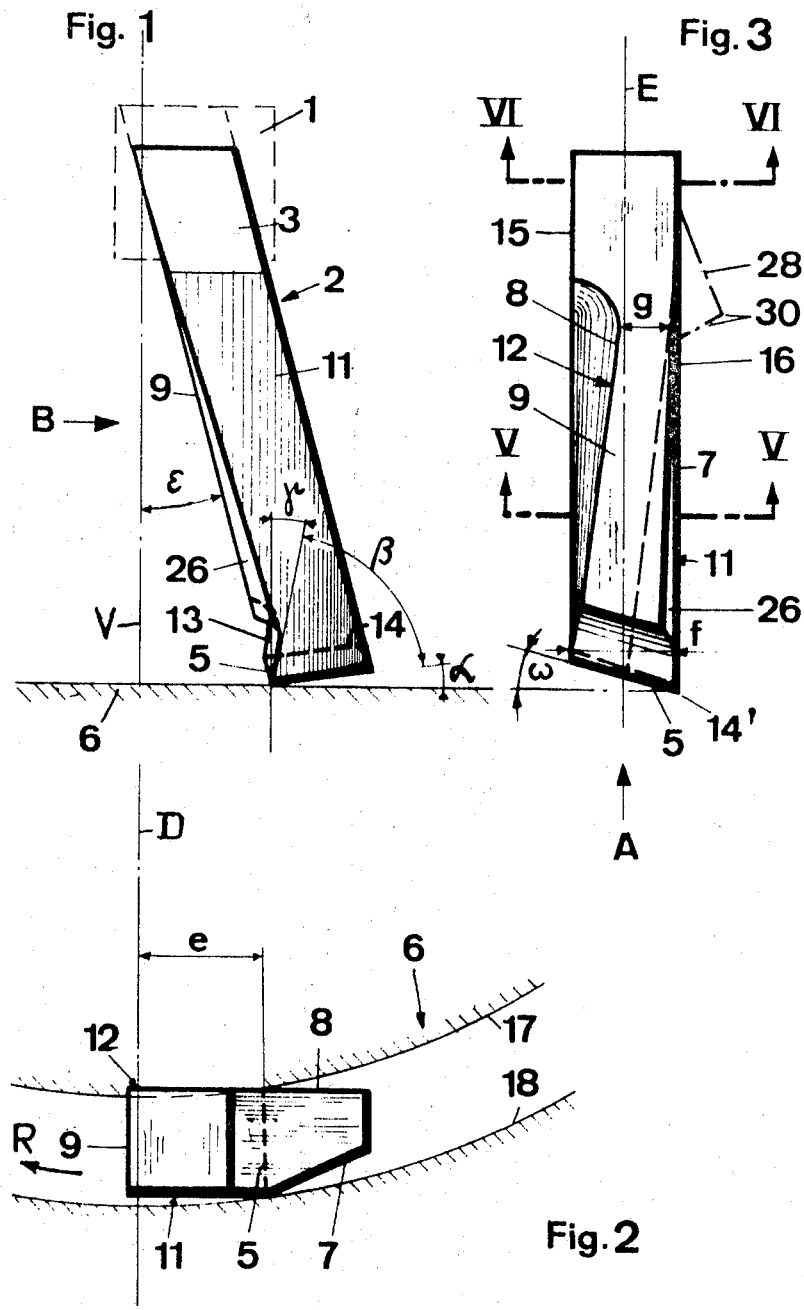
INVENTOR
GEORGE VAL
BY Jacobi & Davidson
Attorneys Oct. 7, 1969  G. VAL  3,470,597
CUTTING TOOL
Filed Jan. 11, 1967  2 Sheets-Sheet 2
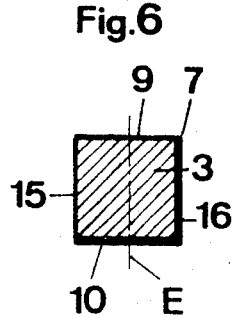
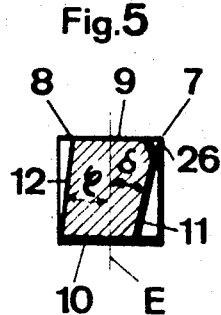
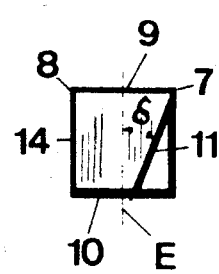
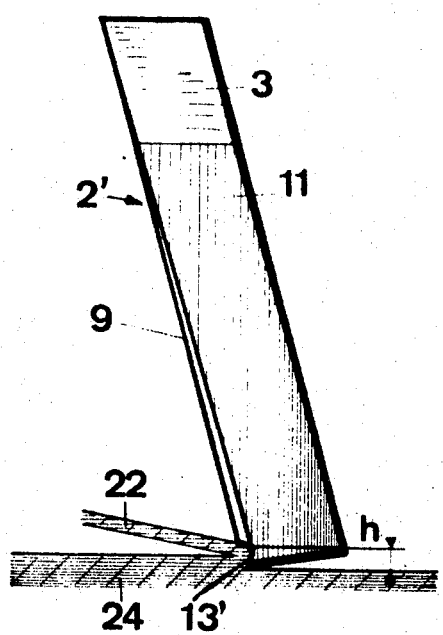
INVENTOR
GEORGE VAL
BY United States Patent Office 3,470,597
Patented Oct. 7, 1969

3,470,597
CUTTING TOOL
George Val, Dallikon, Switzerland
Filed Jan. 11, 1967, Ser. No. 608,522
Claims priority, application Switzerland, Jan. 17, 1966,
568/66
Int. Cl. B23p 15/28; B26d 1/00
U.S. Cl. 29—95                                           10 Claims

ABSTRACT OF THE DISCLOSURE

A cutting tool especially for use in a groove cutting device wherein the side surfaces of the cutting tool are inclined at least throughout a portion of their respective lengths in the same direction with regard to a longitudinal central plane taken through the body portion of the cutting tool. The angle of inclination of each of these two side surfaces is in a given relationship to one another.

Brief description of the invention

The present invention relates to an improved cutting tool, particularly a material removal groove cutter tool for use in conjunction with a circular cutter or turning device.

Cutting tools of this type serve in circular cutting apparatuses, together with bore machines or lathes, for the cutting of round or circular openings in sheet metal or metal plates or other solid materials which are to be machined.

Owing to an inclination of the cutting tool—viewed towards the front from the cutting edge—while simultaneously maintaining a positive cutting angle, that it to say, employing a so-called drawing or pulling cut, it is possible to obtain very favorable cutting results and surprisingly large groove depths, even in otherwise difficult to machine metals.

However, with such cutting tools the problem exists, owing to their inclined position, namely if they are intended to produce very deep grooves, that the cutting tool is strongly weakened with increasing distance from the cutting edge due to the required undercutting or back cutting of the side surfaces or flanks. In other words, the remaining cross-sectional surface of the cutting tool is considerably reduced at the region of its clamping or attachment portion in comparison to the cross-sectional surface at the cutting edge. The larger the inclination of the cutting tool with respect to the axis of rotation and the greater the length of the cutting tool that much more unfavorable becomes the cross-sectional surface directly in front of the clamping or attachment location.

Summary of the invention

Accordingly, it is a primary object of the present invention to provide an improved cutting tool for circular cutters with a draw-cut material removal machining operation and which is extremely suitable for the producduction of deep grooves or the like.

Another significant object of the present invention relates to an improved cutting tool of the type described wherein weakening of the cross-section is held to a minimum.

Yet another noteworthy object of the present invention is directed to an improved cutting tool for the cutting of grooves, holes and the like, designed in a manner to prevent the side surfaces of the cutting tool above the cutting edge from rubbing against the walls of the groove or widening the groove, to thereby obtain a substantially cylindrical annular groove.

Still a further object of the present invention concerns itself with an improved design of cutting tool for the effective, relatively high performance cutting of grooves, openings or the like with great accuracy and speed.

Generally speaking, the inventive cutting tool is of the type intended to be employed in a material removal groove cutting device and narrows in lengthwise direction from the cutting edge towards its clamping or attachment portion. The inventive cutting tool is generally characterized by the features that both of the side surfaces are inclined throughout at least a portion of their lengths in the same sense or direction with respect to a longitudinal central plane taken through the tool body portion. Further, the inner side surface possesses a smaller or flatter angle of inclination than the outer side surface. As a result, it is possible to produce a cutting tool for the previously considered applications which enables the production of extremely deep grooves or the like.

Brief description of the drawings

Other objects and advantages of the invention will become apparent from the following detailed description taken in conjunction with the accompanying drawings, in which:

FIGURE 1 is a side elevational view of a preferred embodiment of inventive cutting tool;

FIGURE 2 is a top view of the cutting tool of FIGURE 1;

FIGURE 3 is a front view of the inventive cutting tool of FIGURE 1 as seen in the direction of the arrow B thereof;

FIGURE 4 is a bottom view of the inventive cutting tool as viewed in the direction of the arrow A of FIGURE 3;

FIGURE 5 is a cross-sectional of the cutting tool of FIGURE 3, taken along the line V—V thereof;

FIGURE 6 is a cross-sectional view of the cutting tool of FIGURE 3, taken along the line VI—VI thereof; and FIGURE 7 is a modified form of inventive cutting tool for soft materials having the tendency of hooking in, such as brass, hard synthetic materials or the like.

Description of the preferred embodiments

Describing now the drawings and, in particular, the embodiment of FIGURES 1 to 6, it will be recognised that in FIGURE 1 the inventive cutting tool 2 is located in its working position when it is mounted in a circular cutting apparatus, as such is for instance described in detail in my copending United States patent application, Ser. No. 603,956, filed Dec. 22, 1966 and entitled "Apparatus for the Production of Round Openings in Workpieces." This cutting tool 2 incorporates a shank or attachment portion 3 which, at the location where it is clamped or otherwise secured in a holder 1, possesses the solid square or quadratic cross section shown in FIGURE 6. In the exemplary embodiment, the blank from which the cutting tool 2 is ground as a single or integral piece possesses the form of a square or quadratic prism, the four side surfaces 9, 10, 15, 16 of which are pre-ground.

In this cutting tool 2 the following characteristic angles are defined: the cutting angle $\gamma$, the front rake or lip angle $\beta$, the front clearance angle $\alpha$, the angle of inclination $\epsilon$, and the angle of yaw or side angle $\omega$. Owing to the draw cut—in other words the inclined position of the cutting tool 2 with respect to the axis of rotation—this cutting tool 2 with respect to the cutting direction R, is inclined forwardly starting from the cutting edge 5 through the angle $\epsilon$ with respect to a plane or axis V which is parallel to the axis of rotation. The cutting edge 5 is displaced parallely towards the rear through the distance $e$ with respect to the diameter D of a groove which is to be produced in a workpiece 6. This distance $e$ should be preferably larger than the length of a side edge 15, 16 of the cutting tool 2.

In FIGURE 2 the direction of movement of the cutting tool 2 is designated by reference character R. In order to ensure that the cutting tool 2 will not rub against the lateral or side groove walls 17, 18 notwithstanding its inclined position, it is ground in such a manner that its width reduces in the direction of the attachment portion or shank 3. Consequently, the width $f$ at the cutting edge 5 is larger than the width $g$ at the region directly in front of the shank or attachment portion 3, as best seen by referring to FIGURE 3. The forward, outer side edge 7 which is situated behind or above the tip 14' extends linearly over the entire length of the cutting tool 2 and is maintained in the form originating from the blank; likewise the forward front face 9 with the exception of the chip-breaker groove 13. The rear, flat surface 10 extends parallel to the front flat surface 9. The forward inner edge 8, in other words the one disposed closer to the axis of rotation, extends linearly and is inclined to the vertical axis V.

In the region of the shaft or shank portion 3 the side surfaces 15, 16 which are parallel to one another are disposed at right angles to the surfaces 9 and 10 which are parallel to one another. As best seen by inspecting FIGURE 6 the cross section of the shank portion 3, in other words at the attachment or clamping location of the holder 1, is square and maintains the dimension of the blank, whereas the forward portion of the cutting tool 2 is ground in such a manner as will be explained shortly.

In order to facilitate understanding of the subsequent description there is shown in the drawing a longitudinal central plane E taken through the center of the shank portion 3, is disposed perpendicular to the surface 9 and approximately bisecting the cutting edge 5 as shown in FIGURE 3. As will be also recognised from FIGURES 3 to 5 the portion of the cutting tool 2 disposed in front of the shaft or attachment portion 3 possesses, at its external or other side, a side surface 11 which does not extend parallel to the longitudinal central plane E. Under the term "outer or external side" there is to be understood that side of the cutting tool 2 which is facing away from the axis of rotation.

Continuing, it is to be understood that this side surface 11 is not constructed as a flat surface, rather possesses a twist in the sense that the angle $\delta$ of this side surface 11—viewed in given cross-sectional planes—with respect to the longitudinal central plane E reduces with increasing distance from the cutting edge 5. Consequently, there is provided a rotational sense or direction for this side surface 11 which is in counterclockwise direction when viewed in the direction of the arrow A of FIGURE 3.

With regard to the inner side surface 12 it can be assumed that the edge 14 is maintained as the original linearly extending edge of the blank and thus extends substantially parallel to the longitudinal central plane E and is situated in the plane defined by the side surface 15. The side surface 12 does not extend parallel to the longitudinal central plane E, and specifically, the angle $\varphi$, viewed in cross-sectional planes, increases the greater the distance from the edge 5. Consequently, for the twist of this side surface 12 there results a rotational sense—viewed in the direction of the arrow A—which is in clockwise direction. The inclination and thus the direction of twist of both of the side surfaces 11 and 12 is in the same sense or direction with regard to the longitudinal central plane E, whereby in each cross-sectional plane the inner side surface 12 has a flatter or smaller angle of inclination than the outer side surface 11. In the extreme case, namely at the cutting edge 5 the angle of inclination $\varphi$ between the side surface 12 and the longitudinal central plane E is zero, in other words still fulfills the above conditions. Owing to the twist of the side surface 12 the inclination of this side surface with regard to the longitudinal central plane E increases with increasing distance from the cutting edge 5.

The angle of inclination $\delta$ of the outer side surface 11 with respect to the longitudinal central plane E in the region of the cutting edge 5 amounts to 16°–28°, preferably about 20°. This angle $\delta$ successively decreases towards the shaft or attachment portion 3 and directly in front of such amounts to about 10°. The angle of inclination $\varphi$ of the inner side surface 12 with regard to the longitudinal central plane E at the region of the cutting edge 5 amounts to 0°, since the edge 14 remains with the surface of the square blank from which the cutting tool 2 is ground. However, an inclination in the same sense or direction with respect to the side surface 11 of up to about 4° would be possible, in the event a slightly increased weakening of the cross section would be acceptable. This angle $\varphi$ successively increases in the direction towards the shaft or attachment portion 3 and directly in front of the latter amounts to about 8°.

In a preferred embodiment of inventive cutting tool the following angles and dimensions advantageously exist: length of the sides of the square at the shank portion=6 millimeters; total length of the cutting tool=50 millimeters; useful length=maximum groove depth=35 millimeters; angle of inclination $\epsilon$=5° to 45°, preferably 16°, front clearance angle $\alpha$ approximately 9°; lip angle $\beta$ approximately 72°; cutting angle $\gamma$ approximately 9°; angle of yaw $\omega$ approximately 15°.

Under a positive cutting angle it is to be understood that such is greater than 0°, or stated in a different way, that the sum of the angles $\alpha+\beta+\gamma$ is not more than 90°.

It has been found to be advantageous in practice to chamfer or bevel the edge 7 somewhat at the side surface 11 so that a bevelled surface 26 appears, the width of which starting from the chip-breaker groove 13 becomes smaller in the direction towards the shank or shaft portion 3. This bevelled surface 26 which appears at the side of the tip 14' forms an angle of preferably about 40 to 70° with respect to the front surface 9. Consequently, when breaking through the material being machined there is positively safeguarded that the cutting tool will become hooked, whereby the danger of breakage when penetrating through the material at the end of the machining operation is effectively prevented.

If the side surfaces 11 and 12 are constructed in the manner described above, then there results only a relatively small weakening of the cross section at the forward portion of the cutting tool with respect to the entire cross section at the shaft or shank portion. Hence, at this location it is only necessary to grind away relatively little material in order to bring about that the cutting tool will not rub against the walls of the groove and to obtain an optimum tool form.

In the event that no extremely deep grooves are to be produced with the cutting tool and if a somewhat greater weakening is accepted, instead of a twist it can also be sufficient to incline the side surfaces 11, 12 with respect to the longitudinal central plane E as described above, yet to provide them as flat surfaces, whereby also in this case the inner side surface 12 possesses a flatter or smaller angle of inclination than the outer side surface 11. The most favorable angle of inclination in this case is selected approximately as the average value of the above mentioned angular dimensions.

The cutting tool depicted in FIGURE 3 serves in the preferred manner for the machining or processing of workpieces in which a bore is required and the cut-out central piece is waste. On the other hand, if the cut-out circular or round central piece is required, then it is advantageous to direct the angle $\omega$ towards the other side, in other words instead of opening to the left of FIGURE 3 it opens to the right thereof.

If the cut-out bore is to be also still countersunk or reamed in the same working operation, it can be advantageous to provide at the side surface 11 a projection 28 with an edge 30, as such is shown in phantom lines in FIGURE 3.

In FIGURE 7 there is shown a variant of inventive tool which is particularly suitable for materials where the cutting tool has the tendency of hooking in, namely brass, bronze, aluminium, hard synthetic materials (Plexiglas or the like). The cutting tool 2 of FIGURE 7 is constructed in exactly the same manner as that of the embodiment of FIGURES 1 to 6, with the difference that the chip-breaker groove 13' is not as high. The height $h$ of this chip-breaker groove 13' amounts to less than 1.2 millimeters, preferably 0.6 to 0.8 millimeter. The turnings 22 removed from the workpiece 24 are strongly bent or flexed over at the cutting location, namely approximately in the cutting direction, so that there is positively prevented that the cutting tool unintentionally penetrates too deeply into the workpiece. Owing to this surprising effect it is rendered possible to form grooves also in relatively soft materials, previously not possible due to the danger of hooking in and resulting in rupture of the tool or workpiece.

Instead of cutting tools having a square cross section at the shank or attachment portion, it would be also possible to select a different cross-sectional configuration, particularly one having a rectangular form, whereby the shorter side determines the groove width.

The cutting tool preferably consists of a high-grade metal alloy suitable for material removal purposes. However, it would be also possible to produce at least the cutting edge of hard metal or a ceramic material. Under the term "cutting tool" as employed herein there should also be understood materials suitable for machining operations which contain little or no steel. Although it is preferable to form the cutting tool from a blank it could of course be produced by other techniques, such as by sintering processes.

While for purposes of illustration several forms of this invention have been disclosed, other forms thereof may become apparent to those skilled in the art upon reference to this disclosure, and, therefore, this invention should be limited only by the scope of the appended claims.

What is claimed is:

1. A cutting tool for use in a material removal device, comprising a substantially elongated body portion having a cutting edge and an attachment portion for attachment to the material removal device, said body portion narrowing in lengthwise direction from said cutting edge towards said attachment portion, said body portion having a pair of side surfaces, said pair of side surfaces being inclined in the same sense when viewed in a given cross-sectional plane at least through a portion of their respective lengths with respect to a longitudinal central plane taken through said body portion, one of said pair of side surfaces defining an inner side surface and the other an outer side surface, said inner side surface possessing a flatter angle of inclination with regard to said longitudinal central plane than said outer side surface.

2. A cutting tool as defined in claim 1, wherein both said side surfaces possess a twist.

3. A cutting tool as defined in claim 2, wherein the twist of said inner side surface, viewed in the direction of said cutting edge along the longitudinal axis of the cutting tool and starting from said cutting edge, is in clockwise direction and the twist of said outer side surface extends in counterclockwise direction.

4. A cutting tool as defined in claim 1, wherein said inner side surface possesses a forward edge starting at said cutting edge which at least approximately coincides with an associated plane of the attachment portion.

5. A cutting tool as defined in claim 1, wherein the angle of inclination of said outer side surface with respect to said longitudinal central plane at the region of said cutting edge is in the range of about 16° to 28° and the angle of inclination of said inner side surface which is in the same sense and taken in the same cross-sectional plane at most amounts to about 4°.

6. A cutting tool as defined in claim 1, wherein said cutting edge has a tip and is inclined with respect to a plane with which the axis of rotation of said cutting tool is substantially perpendicular, said body portion further including a side edge disposed above said tip which is provided with a bevelled portion.

7. A cutting tool as defined in claim 1, further including a chip-breaker groove at the region of said cutting edge, said chip-breaker groove possessing a height of less than 1.2 millimeters.

8. A cutting tool as defined in claim 7, wherein said chip-breaker groove has a height preferably in the range of about 0.6 to 0.8 millimeter.

9. A cutting tool as defined in claim 1, wherein said cutting tool is formed from a one piece prismatic blank of high performance steel.

10. A groove cutting tool for use in a metal removal device, comprising a body portion having a cutting edge and an attachment portion for fixation to the metal removal device, said body portion narrowing in lengthwise direction from said cutting edge towards said attachment portion, said body portion having a pair of side surfaces, said pair of side surfaces being inclined in the same sense when viewed in given cross-sectional planes at least throughout a portion of their respective lengths with respect to a longitudinal plane taken through said body portion and extending through said cutting edge and substantially perpendicular to the diameter of the groove being cut, one of said pair of side surfaces defining an inner side surface and the other an outer side surface, said inner side surface possessing a smaller angle of inclination with regard to said longitudinal plane than said outer side surface.

References Cited

UNITED STATES PATENTS

| | | | |
|---|---|---|---|
| 2,348,759 | 5/1944 | Sneed | 29—95 |
| 2,374,890 | 5/1945 | Pelphrey | 29—95 |
| 2,392,001 | 1/1946 | Raper | 29—95 |
| 2,924,872 | 2/1960 | Wildhaber | 29—95 |
| 2,932,083 | 4/1960 | De Nicolo | 29—95 XR |
| 3,127,663 | 4/1964 | Karlan | 29—97 XR |

HARRISON L. HINSON, Primary Examiner

U.S. Cl. X.R.

29—105